United States Patent [19]

Paschen et al.

[11] 4,244,905

[45] Jan. 13, 1981

[54] METHOD AND APPARATUS FOR THE MANUFACTURE OF MOLD BODIES, PARTICULARLY PELLETS FROM SECONDARY SLURRIES OF THE METALLURGICAL INDUSTRY

[75] Inventors: Peter Paschen; Rao, Chatty, both of Bergisch Gladbach; Helmut Preuss, Bornheim; Werner Wenzel, Waldkirch; Heinrich-Wilhelm Gudenau; Reinhold Schönberger, both of Aachen, all of Fed. Rep. of Germany

[73] Assignee: Klöckner-Humboldt-Deutz AG, Fed. Rep. of Germany

[21] Appl. No.: 940,561

[22] Filed: Sep. 8, 1978

[30] Foreign Application Priority Data

Sep. 8, 1977 [DE] Fed. Rep. of Germany ....... 2740372

[51] Int. Cl.³ .............................................. B28B 1/26
[52] U.S. Cl. ........................................ 264/86; 264/256
[58] Field of Search ................................ 264/86, 256

[56] References Cited

U.S. PATENT DOCUMENTS

| 1,459,357 | 6/1923 | Booze | 264/256 |
| 2,348,829 | 5/1944 | MacArthur | 264/86 |
| 2,784,085 | 3/1957 | Denning | 264/86 |

Primary Examiner—John A. Parrish
Attorney, Agent, or Firm—Hill, Van Santen, Steadman, Chiara & Simpson

[57] ABSTRACT

Method and apparatus for the manufacture of molded bodies from sludges in which a plurality of sludges having different average particle sizes are subjected sequentially to filtration and dehydration in a mold to build up the molded body.

6 Claims, 6 Drawing Figures

METHOD AND APPARATUS FOR THE MANUFACTURE OF MOLD BODIES, PARTICULARLY PELLETS FROM SECONDARY SLURRIES OF THE METALLURGICAL INDUSTRY

FIELD OF THE INVENTION

The invention relates to a method and an apparatus for the manufacture of mold bodies, particularly pellets, from secondary slurries in the metallurgical industry.

DESCRIPTION OF THE PRIOR ART

Methos are already known in order to agglomerate secondary substances in the metallurgical industry, particularly the ironworks industry, as for example blast-furnace-flue-dust LD-converter-sludges, steelworks-dusts, sintering dusts, etc., then to reduce in a direct-reduction-process, and to introduce the reduced iron sponge in the blast-furnace and/or in the steel converter (see proceedings of iron-making conference AIME 33, 1974, (pages 73 to 80).

In this connection, the agglomeration process is carried out predominantly according to the classical sintering-pelletizing or briquetting-method.

These known methods, however, have the following disadvantages.

In order to be able to produce pellets, the secondary slurries must first be dehydrated. As the latter however, are present predominantly in the finest-grain-range (0 to $40\mu$), the dehydration process cannot be carried out with the aim of attaining a residual-moisture content of circa 8 to 10% for the following pelletizing step. Therefore, the slurry must be subjected after a first mechanical dehydration step to a subsequent thermal drying process. For the attainment of a definite grain size, this is followed by a comminution operation, whereupon the product is moistened again for the purpose of the pelletizing. In spite of this expensive modus operandi, also the plurality of method steps often does not bring about the desired pellet quality, because the distribution of binding medium and water, on account of the fineness of the basic material, often is not homogeneous enough.

Besides, the pellets thus produced have the tendency, in the calcination operation, of splitting or bursting, as the water-capillaries on account of the finest grain are very fine and therefore locally high water-vapor-pressures occur in the pellet core.

The supply of secondary slurries to a sintering mixture has the further disadvantage, that the gas permeability of the sintering layer, and therewith the sintering output of the sintering band are very strongly diminished. In addition, the danger exists of the vaporization of lead, zinc and alkalies in the sintering-exhaust-gases.

If, to the contrary, the secondary slurries are to be briquetted, the latter must first be thickened again, then filtered, dried, ground and homogenized. This results likewise in an extensive chain of procedures with high costs. The danger that on account of too low porosity, the briquetted castings are inclined to burst in the drying- and sintering-process, is also with this method —as in the case of the pellets—not to be excluded.

SUMMARY OF THE INVENTION

It is therefore the object of the invention, to suggest a method for the manufacture of mold bodies or castings from secondary slurries of the metallurgical industry, which can be carried out with appreciably lower expenditure, than the known methods, and in this connection the disadvantages, particularly in the case of the finished product, are prevented. A further object of the invention is to make available a corresponding apparatus for the purpose.

With the invention, the problem is solved thereby, that the shaping takes place during and with the aid of a multi-step, preferably two-step filtration-dehydration.

In this connection, the procedure is carried out so that the shaping takes place in an operational process with two steps directly following one another, whereby in the first step, a primary coarse-grain-filter-cake-layer is produced from a sludge with solids particles of a definite grain size range and directly thereafter in the second step, a secondary finest-grain-filter-cake-layer superimposing the same is produced from the sludge containing the secondary slurry.

In an embodiment of the method it was found suitable that the definite grain size range of the solids particles is present in approximately the following gradation:

circa 20% to 40%, preferably circa 30% $<40$ $\mu$m circa 40% to 70%, preferably circa 60% between 40–300 $\mu$m circa 0% to 20%, preferably circa 10% between 300 to 500 $\mu$m.

A suitable carrying out of the method is also still attained then when the grain build-up of the secondary slurry lies at approximately 100% below 40 $\mu$m.

Finally, it was found suitable, that the ratio by weight of the filter layers of a mold body lies between 70% /30% and 30% / 70%, preferably at approximately 50% / 50%.

An apparatus for the carrying out of the method consists therein, that with at least one solids-liquid-filter, in which a mold grid is arranged on the filter floor or plate, the filter for the impingement with different types of sludge is equipped with at least two sludge-storage-members disposed consecutively in the sludge-entry-area.

A suitable embodiment of the apparatus results with an arrangement, whereby a sludge-storage-member for the coarse-grain sludge, viewed in direction of operation of the filter, is connected in series with a sludge-storage-member for the secondary-slurry-sludge.

In further development of the apparatus, the measure may also be tried, that the sludge-storage-members are arranged in a container and are separated from one another by a partition.

Embodiments of the invention as well as their advantages, will be described in greater detail on the basis of drawings, as well as on the basis of a practical embodiment by way of invention, and is explained in this connection in detail.

DESCRIPTION OF THE PREFERRED EMBODIMENTS

Figure 1:
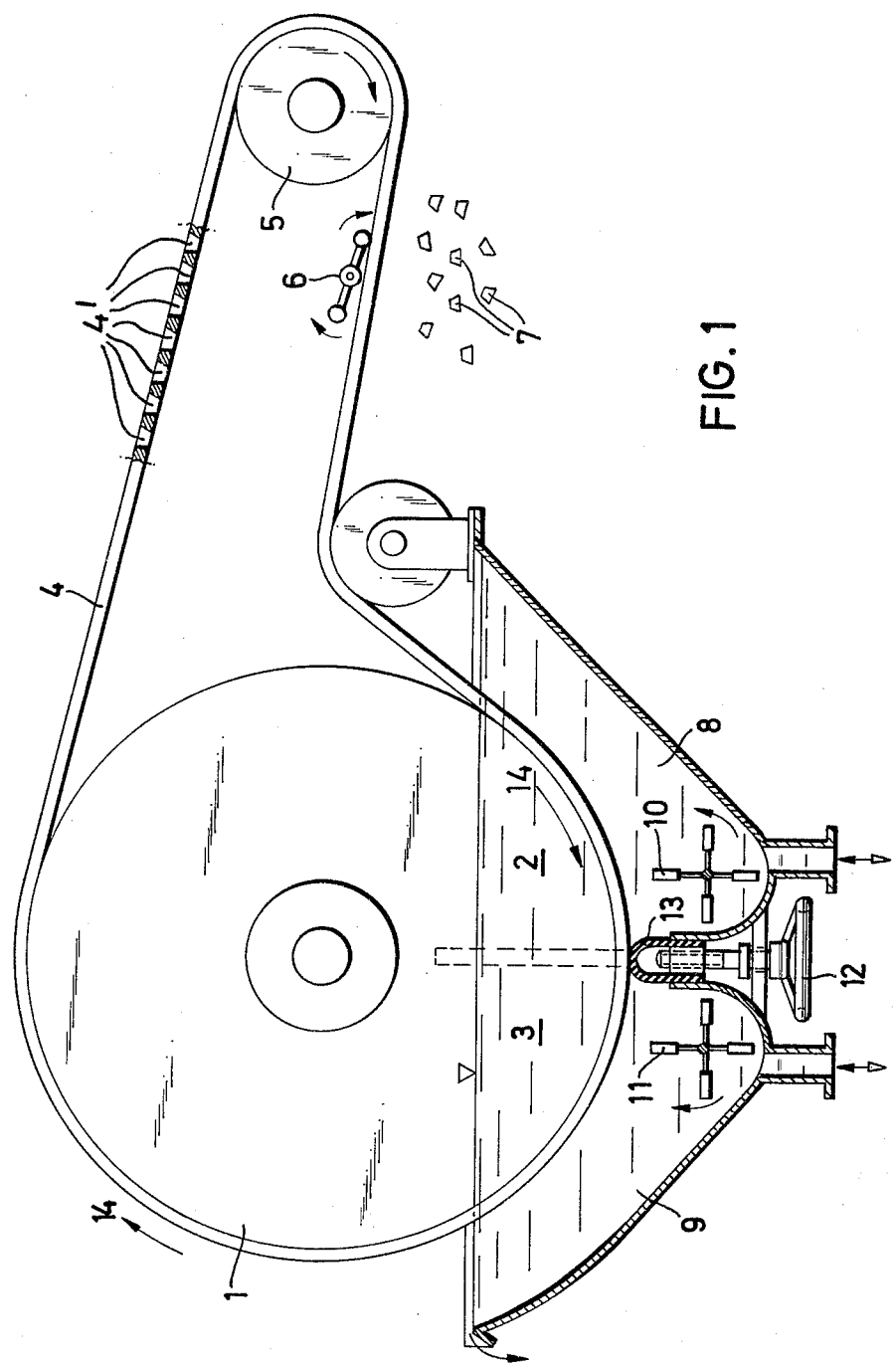
FIG. 1 shows a vacuum-drum-filter with a honeycomb-form-band and two sludge-storage-members arranged underneath the filter drum, this being shown in section.

FIG. 1 shows a rotatable filter-drum 1 dipping partially into ore-slurry, on whose surface the filter-cake deposits. This filter drum 1 is surrounded in the immersion areas 2 and 3 by a grid-type divided, endless moldband 4 moved together with the filter drum 1, in whose intermediary chambers 4' the filter cake adhering to the filter surface is embedded in form of individual mold bodies 7.

The molding band 4 is guided with the embedded mold bodies 7 to a deflecting roller 5 and further to a tapping station 6, where the mold bodies 7 are knocked out of the grid openings 4' of the band 4.

Underneath the filter drum 1 are arranged two separate sludge-storage-members 8 and 9. In the latter are located the agitator units 10 and 11, by means of an elastic partition-arrangement 13 adjustable to a spindle-arrangement 12, the separation of the two sludge-storage-members 8 and 9 is maintained and subsequently in operation adjusted from case to case.

In the direction of movement of the drum 1 or of the grid-mold-band 4, indicated by the directional arrow 14, the filtration process of a considered filter part sets in first in the sludge-storage member 8 and is continued after passing of the partition 13 in the sludge-storage-member 9. The sludge-storage-member 8 contains the coarse-grain sludge with definite grain-band, while the finest material-sludge from the secondary slurry is located in the sludge-storage-member 9.

In the first step of the filtration process, there is formed within the sludge-storage-member 8, a primary layer of solids particles with a definite grain size range, which has the special function of protecting the filter-cloth from every impurity or clogging by means of the next following finest materials of the secondary sludge.

In the second step of the filtration process, in the course of the rotary movement of the filter, the secondary slurry located in the sludge storage member 9 is sucked through the primary layer. Thereby, the primary layer acts as prefilter and protects the filter medium lying underneath the mold-grid from the penetration of the finest-grain-constituents.

Figure 2:
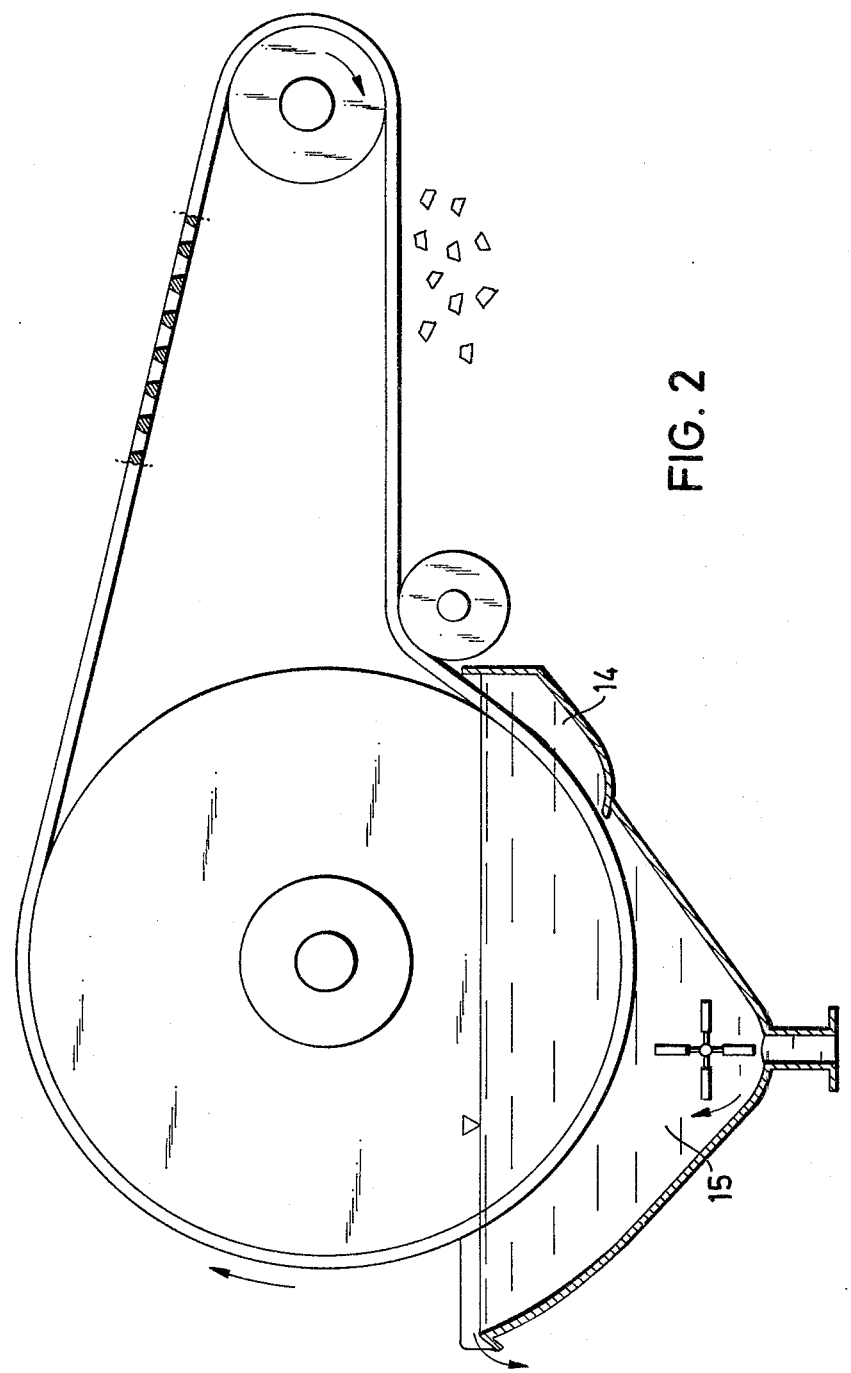
FIG. 2 shows a similar arrangement with asymmetrical division of the two sludge-storage-members, likewise in section.

FIG. 2 shows a somewhat different division of the slurry-storage member. The coarse-grain-slurry is located in the storage member 14, connected in series, which on account of its position and the relatively small volume, in contrast to the storage member 15 filled with secondary slurry-sludge, has no agitator system. The modus operandi of the modified apparatus, however, is principally the same as that of FIG. 1.

Figure 3:
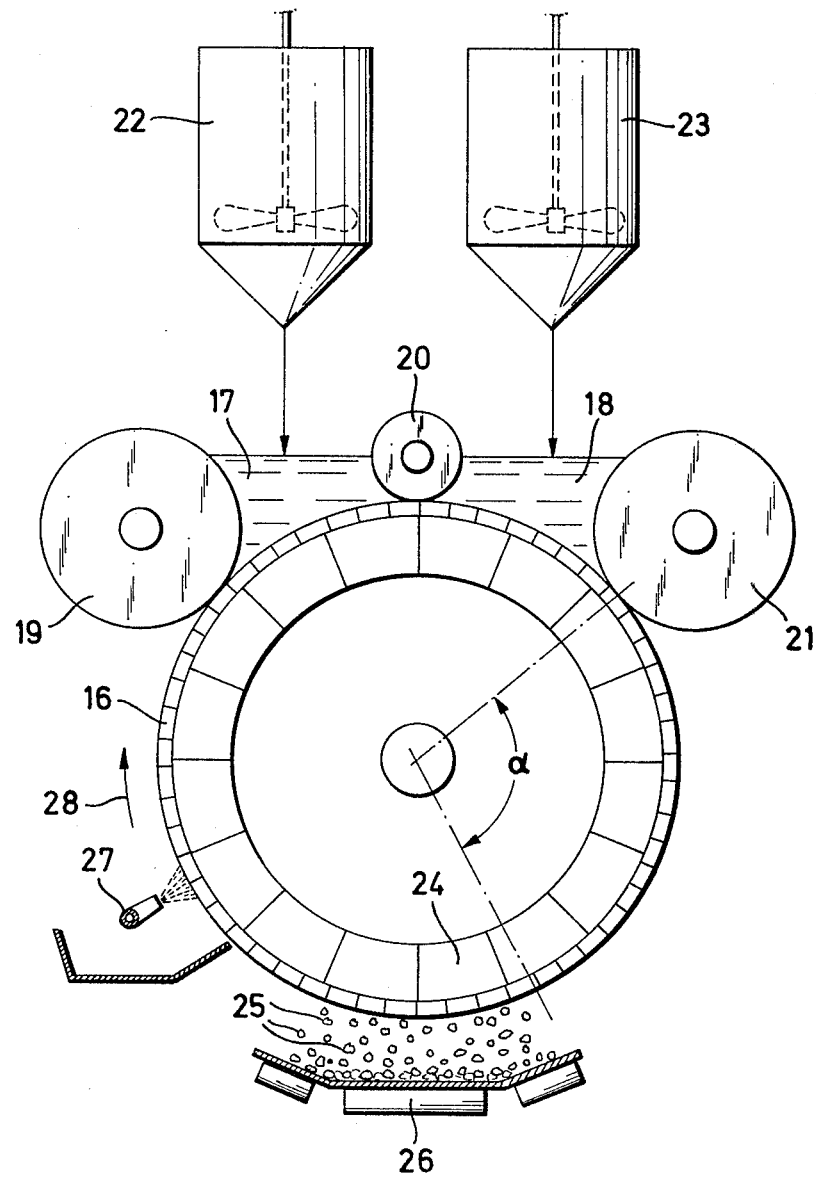
FIG. 3 shows a drum-plate-filter with fixed arrangement of the mold grid, and two sludge-storage-members disposed above the same, in section.

FIG. 3 shows a vacuum-drum-plate-filter with a mold-grid-band 16 forming the outer periphery. Above the mold-grid-band 16 are arranged the slurry storage members 17 and 18. They are limited by rollers 19, 20 and 21 made of highly elastic synthetic material, unwinding sealingly on the surface of the mold-grid-band 16. The two different types of slurry are introduced with the aid of the two charging apparatus 22, 23 into the corresponding slurry-storage members 17, 18. In the lower area 24 of the filter-drum, the blanks 25 are ejected and caught by a conveyor belt 26. With a washing apparatus 27 the mold-grid-belt 16, which moves in direction of the arrow 28 is purged of adhering material before the re-immersion in one of the slurry storage members 17, 18.

Also with this embodiment of the apparatus, the function accordng to the following explanation is easily to be noted. Upon immersion of a considered part of the molding band or belt 16 in the first slurry storage member 17 in direction of movement of the arrow 28 with the coarse slurry, there is deposited in the mold-pans of the mold-grid-band 16 a primary filter-cake-layer made of solids-particles with a definite grain size range. After passage through the separating roller 20, the filter part with the primary layer of a blank thus formed dips into the slurry of the storage member 18, whereby a further secondary layer of the solids particles of the secondary sludge deposits or is added onto—above the first filter cake layer, and together with the primary filter-cake-layer forms the finished blank.

Upon the further rotation of the filter drum by the angle α, which amounts to approximately 90°, fargoing dehydration- and drying-process is carried out. In the lower area 24, the drum then ejects the finished blanks, on account of an air-excess-pressure impact called forth with the control, said blanks dropping on the conveyor device 26 and from there they are transported to the subsequent drying- and sintering-apparatus.

Figure 4:
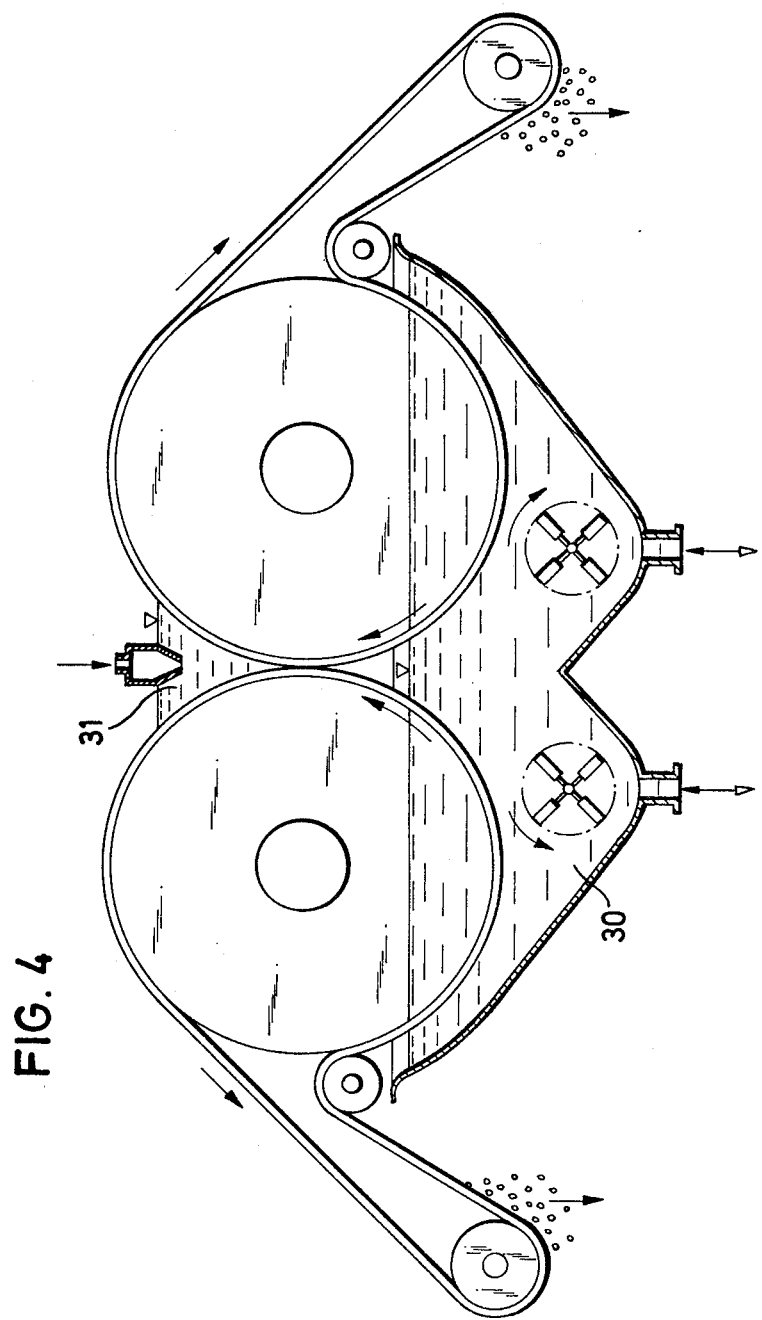
FIGS. 4 and 5 show a double-grum-filter arrangement, with separate sludge-storage-members, in section.
Figure 5:
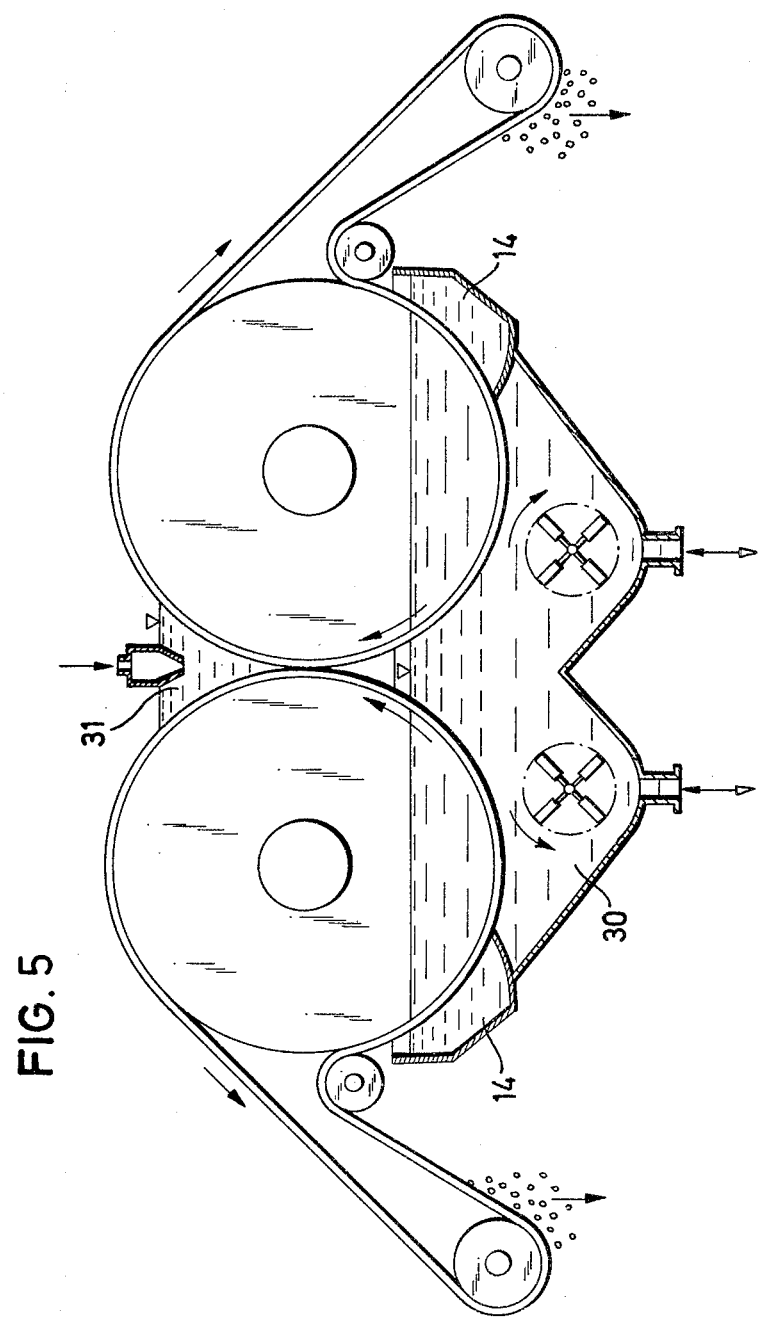

FIG. 4 shows an arrangement know in its basic principle per se, of a double-drum-filter, equipped for the two-material filtration according to the invention, with both a first slurry-storage member 30 disposed below the filter drums for the slurry with the coarse particles, as well as also with a second slurry storage member 31 disposed above the grid-type mold bands, for the secondary-sludge-slurry. FIG. 5 shows a double-drum-filter for the three-material-filtration with three slurry-storage-members 74, 30, 31.

The function of this device requires for the expert no further explanations, as the latter is self-explanatory according to the preceding examples, and because the function of the principle is similar to the filtration devices further described above.

Figure 6:
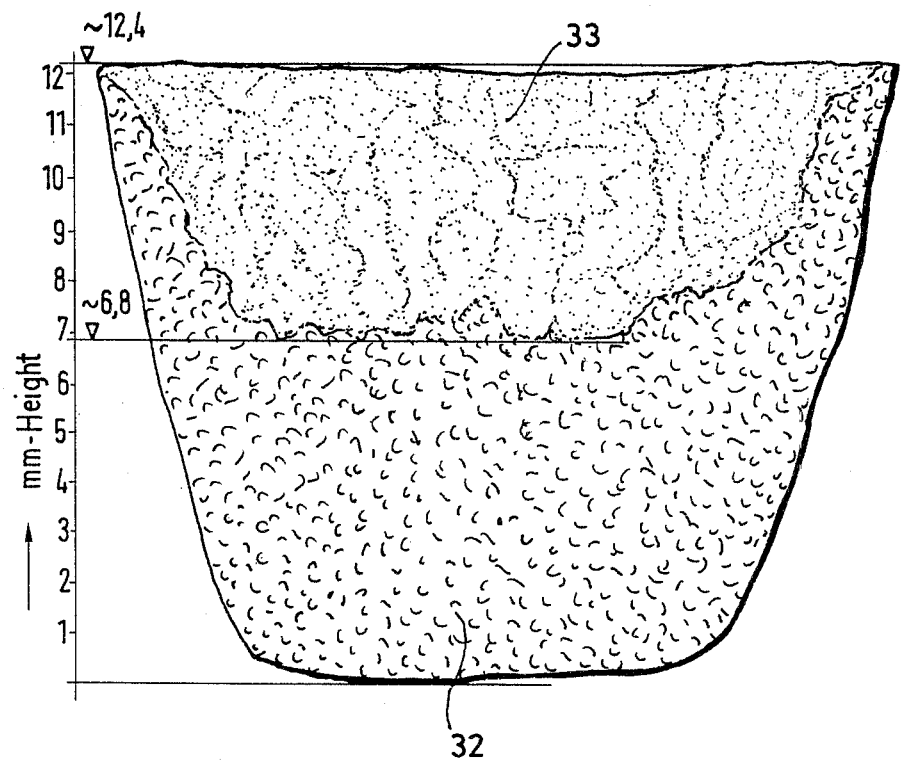
FIG. 6 shows a filter-mold-body, made of two layers, consisting of coarse-grain and finest-grain, in approximately 10-fold enlargement, in section.

FIG. 6 shows the result of the method according to the invention in form of a filter-mold-body, which consists of the two superimposed layers of filter cakes. A primary coarse layer is designated with the number 32, which consists in the present example of coarse-grain-magnetite-concentrate. A secondary layer is indicated by 33, which consists of the finest materials of an LD-converter dust. From FIG. 5, the occurrence of the filter-mold-body is clearly recognizable with the aid of a two-step filtration process.

The especial advantages of this manner of procedure are the following:

There is offered the possibility, without problems, of the inclusion of the finest secondary-slurry-particles together with a primary slurry-consisting of coarse-grain of a definite grain size range in one single filtration process. Thereby is attained an optimal filling of the cavities of the mold body, without all too narrow capillaries. Through partial deposit of finest parts in the intermediary spaces of the coarse particles, the total strength, that is both the green strength as well as also the burn-strength of the mold bodies produced improves by means of bridge-formation, whereby the finest particles assume the function of a binder.

The method of procedure is, as may be imagined, simple, because the proceeding up to production of the green mold body takes place in a single process in two steps directly following one another.

The multi-layer-body offers the possibility of the charging on a sintering belt or after thermal treatment in a reduction kiln or if need be also in a shaft or pit furnace, blast burnace, etc.

The Pb, Zn as well as alkali level of the produced produce is lowered to an appreciable extent by means of inclusion of Pb-, Zn- and alkali-free ore- or mineral-constituents, respectively.

In the following, the invention is explained in still greater detail on the basis of an example:

A Russian magnetite concentrate with a sieve-analysis according to the following Table 1 and a slurry of 2,000 g solids/l was charged into the first slurry storage member of a described apparatus, and sucked up for 5 seconds. The thickness of the sucked up primary layer amounted with intensive agitation in the slurry storage member to circa 6 mm.

In the course of the further rotation of the filter drum, the secondary sludge charged into a following, second slurry-storage-member, namely, an LD-converter sludge, whose chemical composition as well as sieve analysis is to be inferred from the Tables 2 and 3,—as sucked up for ten seconds in time through the primary layer of the coarse filter-cake. Thereby, the slurry of the LD-converter sludge obtained 600 g solids/l. The thickness of the secondary layer sucked up thereby amounted on the average out of a series of 20 tests to 6.5 mm. (See FIG. 5). Thereupon took place a dry suction of the two-layered filter cake for a time duration of 40 seconds. The final moisture of the filter cake amounted in medium to 8.3%. The green filter blanks produced were by means of a knocking apparatus, ejected and subsequently subjected to a drying process. The dry strength of the produced mold body or blanks with the dimensions of 14×14 mm. edge-length and on the average 12.5 mm. height, amounted to circa 20 N per mold body.

Table 1

Sieve analysis of the Russian magnetite concentrate used
below 40 μm—35%
40–300 μm—60%
300–500 μm—5%

Table 2

$Fe_2O_3$—57%
$SiO_2$—1.5%
CaO—7.1%
$Al_2O_3$—0.3%
Pb—0.13%
Alkalies—0.4%

Table 3

Sieve analysis of the LD-converter sludge used
below 40 μm—100%

The invention, particularly the apparatus for carrying out the method, is not limited to the examples described and shown. Rather a plurality of possibilities of variation are to be imagined within the framework of ordinary practices in the filtration technique, or of apparatus, which are without further ado accessible to the expert intrusted with the filtration technique. All such embodiments of the invention fall in any case within their scope, insofar as they satisfy the following patent claims.

The method contains also thereby an essentially advantageous modification, because the deposit of the finest material particles in the structure of the coarse-filter-layer appreciably improves its coherence.

Therefore, for the first time, with the invention—in the upper grain range of the defined grain band, an upper limit up to circa 1 mm may be utilized—in contrast with the known pelletizing methods.

We claim:

1. A method for the production of molded bodies from physically separated slurries having solid particles of different sizes dispersed therein which comprises:
   depositing coarser particles from a first slurry containing such particles on a moving molding surface having liquid permeable cavities while said surface passes through said first slurry to remove liquid from said first slurry,
   depositing finer particles from a second slurry containing such particles over the previously deposited coarser particles while said surface moves through said second slurry, thereby forming discrete molded products having deposited layers of different sized solid particles in said cavities, and
   removing the resulting molded products from said cavities in said molding surface.

2. A method according to claim 1 in which said first slurry has the following composition:
   about 20 to 40% particles having a grain size below 40 microns,
   about 40 to 70% particles having a grain size of 40 to 300 microns, and
   0 to 20% particles having a grain size of 300 to 500 microns.

3. A method according to claim 1 in which said second slurry has substantially 100% of its particles below 40 microns in dimension.

4. A method accordng to claim 2 in which said first slurry has a composition of about 30% particles having a grain size below 40 microns, about 60% particles having a grain size of 40 to 300 microns, and about 10% of particles having a grain size of 300 to 500 microns.

5. A method according to claim 1 in which said particles are deposited in such proportion that the molded body contains from 30 to 70% by weight of the coarser particles and 70 to 30% by weight of the finer grained particles.

6. A method accordng to claim 1 in which said particles are deposited in such proportion that the molded body contains about 50% by weight of the coarser particles and about 50% by weight of the finer grained particles.

* * * * *